A. PETIT & G. DE BERCHOUX.
HAND PRESS FOR RAW MEAT.
APPLICATION FILED APR. 15, 1909.

934,209.

Patented Sept. 14, 1909.

UNITED STATES PATENT OFFICE.

AUGUSTE PETIT AND GABRIEL DE BERCHOUX, OF LYON, FRANCE.

HAND-PRESS FOR RAW MEAT.

934,209.

Specification of Letters Patent. Patented Sept. 14, 1909.

Application filed April 15, 1909. Serial No. 490,129.

*To all whom it may concern:*

Be it known that we, AUGUSTE PETIT and GABRIEL DE BERCHOUX, citizens of France, residing at Lyon, France, have invented new and useful Improvements in or Relating to Hand-Presses for Raw Meat, of which the following is a specification.

This invention consists in improvements in or relating to hand presses for raw meat.

Hand presses intended for pressing raw meat to obtain the juice of the meat intended principally for feeding invalids, convalescent persons, etc., are usually formed of a cylinder closed at one end in which cylinder is a piston, the meat to be pressed being inserted in the cylinder and pressed by the piston which is moved by hand by means of appropriate devices. The result given by this kind of press is poor, as the bottom of the cylinder and the piston have smooth surfaces which are in contact with the meat, the fibers of the latter slide on these surfaces under the pressure, and consequently the juice contained in the meat cannot be completely pressed out.

The production of juice would be considerably increased if the fibers of the meat were pressed and held between rough surfaces for instance between gratings or metallic wires. However, the employment of such gratings gives rise to serious inconveniences. In the case where they consist of disks or rectangles cut from a metallic trellis, the sharp edges formed by the cut threads might cause injury to the person using them. On the other hand if the edge of these disks or rectangles is bordered by a rim formed by a piece of bent metal, the inconvenience mentioned above would be overcome, but it would almost be impossible to unite the rim to the disk without cavities or interstices remaining between the wires of the grating and the rim sufficiently large to retain particles of meat or substance which could not be completely removed even by very careful cleaning. Such particles would produce in time fermentations which would be unpleasant and even dangerous to the persons consuming the juice or substance of the meat produced by such a press.

The present invention is for the purpose of overcoming these inconveniences which is one by the employment of gratings of special shape and construction.

The annexed drawing shows as an example a grating of circular form.

Figure 1:
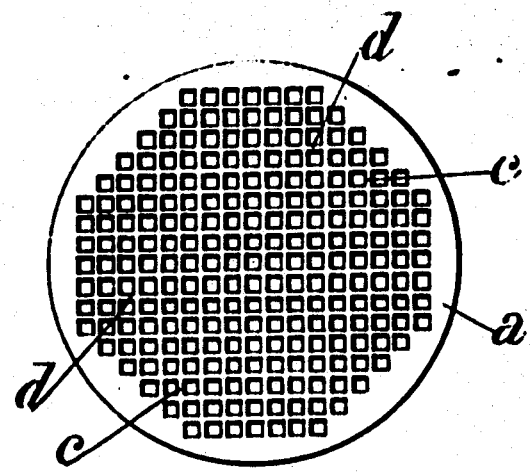
Figure 3:
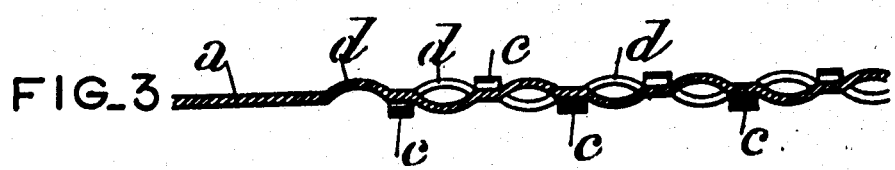
Figure 2:
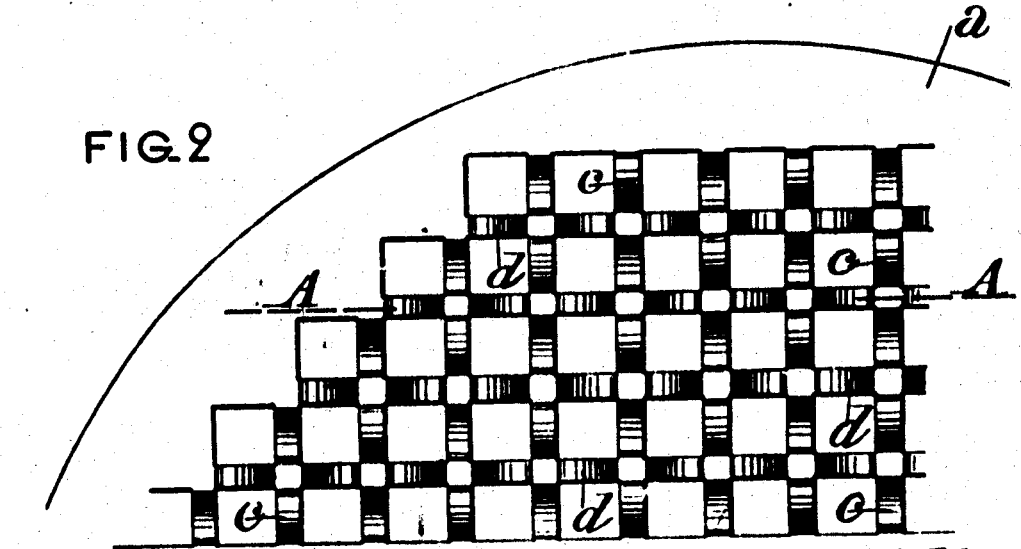

Figure 1 is a front view, Fig. 2 shows a portion on a larger scale, and Fig. 3 is a section on the line A, A, of Fig. 2.

The grating is formed by a metallic disk $a$ of which the greater part of the surface is perforated with a number of square holes arranged regularly and of which the whole forms for example a polygon. The parts between the square holes form bands $c$ $c$ crossing at right angles with bands $d$ $d$. By means of a suitable tool the parts of the bands between two consecutive squares are bowed alternately in opposite directions so as to form projections on both sides of the plate. Fig. 2 illustrates by the shading the undulations of the bands $c$ and $d$ and Fig. 3 clearly shows in section the undulation of one of these bands. The rim of the disk $a$ is a flat continuous surface.

The method of using the disks is as follows: In the cylinder of an ordinary hand press separated from its piston firstly a disk is inserted which rests on the bottom of said cylinder, a layer of the meat to be pressed is then put in and covered by a second disk, layers of meat being added as desired each separated by a disk, the last layer is also covered with a disk on which the piston rests. At the time of pressing the fibers of the meat are retained by the parts in relief of the bands $c$ and $d$ and cannot slide against the surfaces of the disks, it follows that the pressure being uniformly divided permeates the whole mass of the meat, the juice or substance of the latter is entirely pressed out, it traverses the holes in the disk and flows out through the channels provided in the press.

When a small quantity of food is to be pressed forming only a single layer perforated disks can be employed of which the undulations of the bands $c$ and $d$ are all similar in order to form projections only on one side of the disk. In this case care must be taken that the sides of the disks do not carry any projection in contact with the piston or the bottom of the cylinder, the projections being always in contact with the food to be pressed. Similar disks can also be employed when the meat is divided into several layers being utilized for the first and the last layers.

The bands $c$ and $d$ can be undulated in any other manner than that described, or stamped or embossed to form projections of any kind able to sufficiently hold the fibers of the meat so as to obtain the maximum production of juice or substance while preventing by the formation of these projections the existence of interstices where fermentations could lodge. For example a practical arrangement would consist in stamping the cut out plate so as to form circular concentric channels arranged in such a way that the holes of the plate are at the bottom of the channels and at the summit of the same. To facilitate the flow of juice from the pressed meat, the non-perforated border of the plate could form channels leading to the exterior.

The dimensions of the disks or rectangles vary with the dimensions of the presses to which they are to be applied. The metal employed for their construction can be of any kind and is preferably tinned with fine tin, or nickeled, or they may be of pure nickel. Instead of being cut out, stamped or embossed, the disks could be formed by casting or molding to the desired form and the holes can be of any appropriate form.

Having now described our invention what we claim as new and desire to secure by Letters Patent, is:

An improved metallic grating for presses for food, consisting of a plate of metal of which the greater part of the surface is provided with square rectangular or other shaped holes, leaving between them plain parts forming bands crossing each other the parts of these bands lying between two consecutive holes being bowed, undulated, or embossed so as to form projections, substantially as and for the purpose described.

In testimony whereof we have signed our names to this specification in the presence of two subscribing witnesses.

AUGUSTE PETIT.
GABRIEL DE BERCHOUX.

Witnesses:
GASTON JEANNIAUX,
THOS. N. BROWNE.